(No Model.)

J. C. GREGORY.
BICYCLE LOCK.

No. 556,050.  Patented Mar. 10, 1896.

WITNESSES:
John Buckler,
L. M. Muller.

INVENTOR
James C. Gregory,
BY
Edgar Tate & Co
ATTORNEYS

UNITED STATES PATENT OFFICE.

JAMES CARLOSS GREGORY, OF PLEASANT HILL, NEBRASKA, ASSIGNOR OF ONE-HALF TO JOHN BARNES, OF SAME PLACE.

BICYCLE-LOCK.

SPECIFICATION forming part of Letters Patent No. 556,050, dated March 10, 1896.

Application filed August 1, 1895. Serial No. 557,854. (No model.)

*To all whom it may concern:*

Be it known that I, JAMES CARLOSS GREGORY, a citizen of the United States, and a resident of Pleasant Hill, in the county of Saline and State of Nebraska, have invented certain new and useful Improvements in Bicycle-Locks, of which the following is a specification, reference being had to the accompanying drawings, forming a part thereof, in which similar letters of reference indicate corresponding parts.

This invention relates to bicycle-locks; and the object thereof is to provide a device of this class which is simple in construction and operation and which may readily be applied to a bicycle as now constructed; and with this and other objects in view the invention consists in the construction, combination, and arrangement of parts hereinafter described and claimed.

The invention is fully disclosed in the following specification, of which the accompanying drawings form a part, in which—

Figure 1:
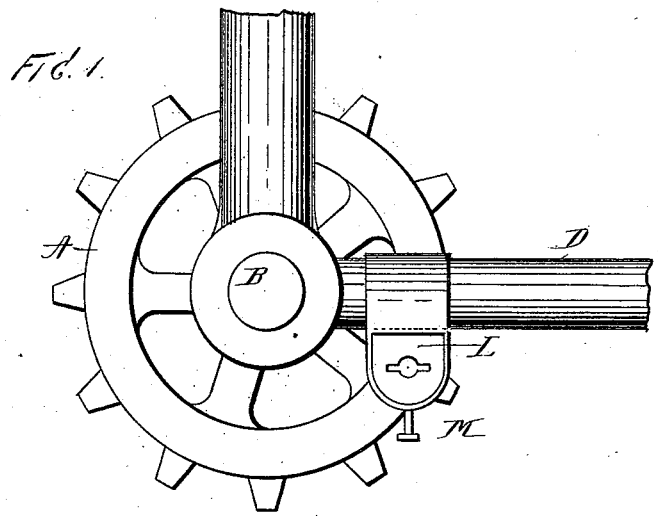
Figure 2:
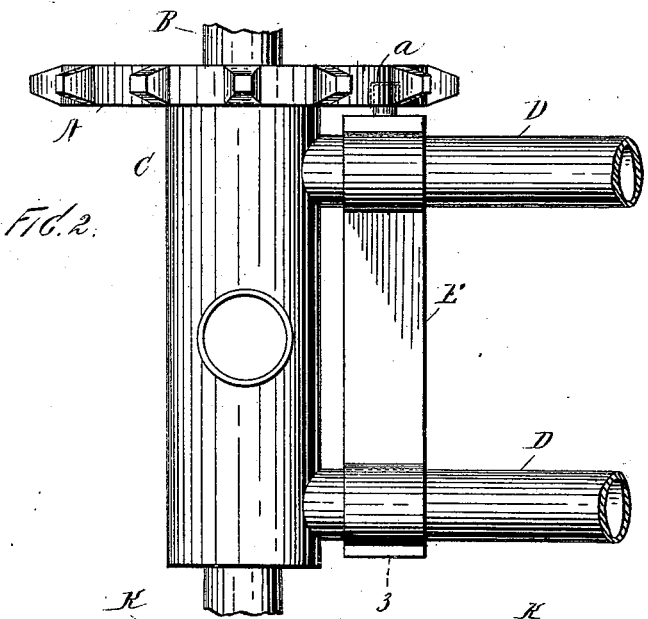

Figure 1 is a side elevation of the sprocket-wheel and connected parts of a bicycle provided with my improved lock; Fig. 2, a plan view thereof, and Fig. 3 a longitudinal section on the line 3 3 of Fig. 2.

In the construction shown in the drawings, A designates the usual sprocket-wheel mounted on the pedal-shaft B, on which is mounted a hub C, with which the frame rods or tubes are connected.

The tubular rods D, as shown in Figs. 1 and 2, are the usual rods employed, by which the hub C and the axle of the drive-wheel are connected, and mounted on the rods D, as shown in Fig. 2, is my improved lock E, which is adapted to slide thereon and is of the following construction:

In the construction of the lock E, I employ a tubular bar F, which is divided longitudinally or composed of two equal portions held together by means of end bands G, which are united by a top plate H, in which are formed loops or rings K, by which connection with the rods D is made. The central bore within the bar F is closed at one end by a plate or head L, within which is formed a keyhole M, and an inwardly-directed annular shoulder O is formed at the upper end thereof. Within the bore F, adjacent to the end in which the keyhole M is formed, is a bolt P, provided with a slotted recess or cavity P' in the outer end thereof adapted to receive a key, and formed adjacent to each end of said bolt are annular flanges or shoulders $p$, adapted to fit within corresponding annular grooves or recesses $p'$ in the inner walls of the bolt K. The inner end of the bolt P is provided with a segmental extension R, and mounted on said bolt between the annular shoulders or flanges $p$ is a spring R', one end of which is secured to the inner walls of the tubular bar T, as shown at $r$, and the other end of which is secured to one of the flanges $p$.

Figure 3:
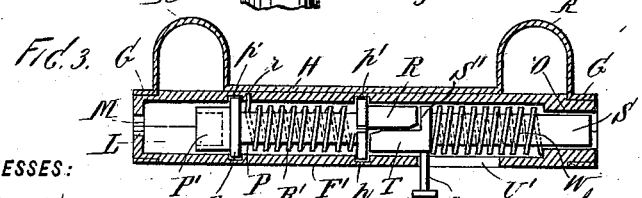

Mounted in the opposite end of the tubular bar F is a spring-operated bolt S, provided at its inner end with a head S' and with a segmental extension T, and when the bolts S and P are in the normal position the segmental extension R and T thereof overlap, as shown in Fig. 3.

Connected with the head S' of the bolt S is a pin U, which extends through a slot U' in the tubular bar F, and mounted on said bolt S is a spiral spring W, one end of which abuts against the annular shoulder and the other end of which abuts against the head S' of the bolt.

The sprocket-wheel A is provided on the side thereof adjacent to the rod D with an aperture or hole $a$, (shown in dotted lines in Fig. 2,) and in operation, or when it is desired to lock the machine, said wheel is turned until said hole or aperture registers with said bolt or is directly opposite the same. When in this position, the pin U, connected with the bolt S, is operated to project said bolt out of the end of the tubular bar F and into the hole or aperture $a$, formed in the sprocket-wheel, at which time the spring R', mounted on the bolt P, operates to revolve said bolt in such manner that the segmental head R, formed thereon, will abut against the inner end of the segmental head T on the bolt S and hold said bolt S in the projected position, in which position it will remain and be securely held until a key, properly constructed, is inserted through the keyhole M and the bolt P revolved thereby, so as to free the segmental heads R and T and allow the spring W to force inward the bolt S.

It will be observed that when the machine is not locked the bolt S is concealed within the tubular bar F, and the sprocket-wheel is free to revolve, and it will thus be seen that I accomplish the object of my invention by means of a device which is simple in construction and operation, and which is also comparatively inexpensive, and which can readily be applied to bicycles as now made.

It is evident that changes in and modifications of the construction shown and described may be made without departing from the spirit of my invention or sacrificing its advantages, and I therefore reserve the right to make all such alterations as fairly come within the scope of the invention.

Having fully described my invention, I claim and desire to secure by Letters Patent—

1. A bicycle-lock, consisting of a tubular bar connected with the rearwardly-extending rods of the bicycle-frame, adjacent to the hub of the pedal-shaft, a spring-operated bolt located in said tubular bar and adapted to be projected into a hole formed in the sprocket-wheel, another bolt located in said tubular bar at the opposite end thereof, and provided with a spring by which it may be revolved, and each of said bolts being provided at their adjacent ends with segmental extensions, whereby when the locking-bolt is projected, the bolt at the other end of the tubular bar will be revolved so as to hold said locking-bolt in the projected position, substantially as shown and described.

2. In a bicycle-lock, the combination of a tubular bar F, divided into two parts, the end bands G, a top plate H uniting said bands, the loops K formed in said plate and a locking mechanism within the tubular bar, substantially as described.

3. In a bicycle-lock, the combination of a tubular bar, a bolt S mounted therein, a pin U connected to said bolt and projecting through a slot U' in the tubular bar, a spring W normally holding said bolt within the tubular bar, a bolt P arranged on the other end of said tubular bar and a spring R' on said bolt adapted to partially turn said bolt when the bolt S is projected beyond the end of the tubular bar to maintain said bolt S in that position, substantially as described.

In testimony that I claim the foregoing as my invention I have signed my name, in presence of two witnesses, this 7th day of July, 1895.

JAMES CARLOSS GREGORY.

Witnesses:
  JOHN BARNES,
  EDWARD BARNES.